(12) United States Patent
Zhong et al.

(10) Patent No.: US 9,467,390 B2
(45) Date of Patent: Oct. 11, 2016

(54) METHOD AND DEVICE FOR DATA TRANSMISSION

(75) Inventors: Yong Zhong, Beijing (CN); Chen Bai, Beijing (CN)

(73) Assignee: ST-ERICSSON SA, Plan-les-Ouates (CH)

(*) Notice: Subject to any disclaimer, the term of this patent is extended or adjusted under 35 U.S.C. 154(b) by 688 days.

(21) Appl. No.: 13/880,110

(22) PCT Filed: Oct. 21, 2011

(86) PCT No.: PCT/CN2011/081101
§ 371 (c)(1),
(2), (4) Date: Jun. 14, 2013

(87) PCT Pub. No.: WO2012/051963
PCT Pub. Date: Apr. 26, 2012

(65) Prior Publication Data
US 2013/0250767 A1    Sep. 26, 2013

(30) Foreign Application Priority Data

Oct. 21, 2010  (CN) .......................... 2010 1 0520796

(51) Int. Cl.
*H04L 1/00*    (2006.01)
*H04L 12/863*  (2013.01)
(Continued)

(52) U.S. Cl.
CPC ......... *H04L 47/6245* (2013.01); *H04L 47/193* (2013.01); *H04L 47/2466* (2013.01); *H04L 69/163* (2013.01)

(58) Field of Classification Search
CPC ............. H04L 47/6245; H04L 47/193; H04L 47/2466; H04L 69/163

USPC ........................................... 370/235
See application file for complete search history.

(56) References Cited

U.S. PATENT DOCUMENTS 6,424,626 B1 * 7/2002 Kidambi ............... H04L 1/1635
                                                      370/236
7,609,697 B2 * 10/2009 Nishida ................. H04L 1/1874
                                                      370/394

(Continued)

FOREIGN PATENT DOCUMENTS

CN           1421079 A      5/2003
CN         101854309 A     10/2010
(Continued)

OTHER PUBLICATIONS

The effects of asymmetry on TCP performance; Hari Balakrishnan; pp. 219-241; Oct. 1999.*
(Continued)

*Primary Examiner* — Faisal Choudhury
(74) *Attorney, Agent, or Firm* — Patent Portfolio Builders PLLC (57) ABSTRACT

A method of data transmission includes establishing a buffer for TCP/IP data packets, receiving and buffering the TCP/IP data packets including TCP payloads and TCP ACKs. A queue of the buffered TCP/IP data is adjusted in accordance with header information of the TCP/IP data packets. The buffered TCP/IP data packets are transmitted sequentially. The method significantly reduces the TCP ACKs, which are transmitted with priority, thereby reducing the round-trip time delay, and improving the data transmission efficiency. An apparatus configured to perform this method is also described.

9 Claims, 4 Drawing Sheets

(51) Int. Cl.
  *H04L 12/801* (2013.01)
  *H04L 12/855* (2013.01)
  *H04L 29/06* (2006.01)

(56) References Cited

U.S. PATENT DOCUMENTS

| | | | |
|---|---|---|---|
| 2003/0074465 A1* | 4/2003 | Tang | H04L 1/1835 709/237 |
| 2005/0068896 A1* | 3/2005 | Pazos | H04L 1/1607 370/235 |
| 2006/0083246 A1* | 4/2006 | Minami | G06F 13/128 370/395.31 |
| 2011/0103379 A1* | 5/2011 | Kim | H04L 1/1664 370/389 |

FOREIGN PATENT DOCUMENTS

| | | |
|---|---|---|
| CN | 102006283 A | 4/2011 |
| WO | 0131833 A1 | 5/2001 |

OTHER PUBLICATIONS

Information Sciences Institute; "Transmission Control Protocol—DARPA Internet Program—Protocol Specification"; University of Southern California; RFC 793; Sep. 1981; pp. 1-88; Marina del Rey, CA.

International Search Report issued in corresponding International application No. PCT/CN2011/081101, mailing date Feb. 16, 2012.

* cited by examiner

| Version | Head Length | Service Type TOS | Total Length | | |
|---|---|---|---|---|---|
| Identification Number | | | Flag | Offset | |
| Time To Live | | Protocol Type | Check Sum | | |
| Source IP Address | | | | | |
| Destination IP Address | | | | | |
| Source Port | | | Destination Port | | |
| Sequence Number | | | | | |
| Acknowledgement Number | | | | | |
| TCP/IP Head Length | | URG ACK PSH RST SYN FIN | Window Size | | |
| Check Sum | | | Urgent Pointer | | |
| Data(Optional) | | | | | |

METHOD AND DEVICE FOR DATA TRANSMISSION

BACKGROUND OF THE INVENTION

1. Field of the Invention

This invention relates to a communication field, and more particularly to a method and apparatus for data transmission.

2. Description of the Prior Art

In the Internet of prior art, the networking and data transmission are mainly implemented by TCP (Transmission Control Protocol)/IP (Internet Protocol). TCP is a connection-oriented, end-to-end protocol. The application layer transmits to the TCP layer a data stream which is used for inter-network transmission and represented by 8-bit bytes, then TCP segments the data stream into data packets with appropriate length and passes the data packets to the IP layer, and then the IP layer transmits the data packets to the TCP layer of a receiving side. In order to avoid the occurrence of packet losses, TCP assigns a sequence number to each byte to ensure that the data packets are received in order at the receiving side. The receiving side sends back a corresponding acknowledgement (ACK) for a group of TCP packets which has been successfully received and verified to be correct. If the transmitting side has received the ACK within a certain time, it will continue to transmit data; and if the transmitting side has not received the ACK within the certain time, or if the transmitting side has received three acknowledgements for a data packet prior to a certain data packet, the corresponding data will be retransmitted as a result.

In the actual TCP/IP transmission, if a round-trip time delay occurs, i.e. if the period from the transmitting side transmitting an IP data packet with a TCP payload (hereinafter referred to as TCP payload) to the receiving side receiving the IP data packet of the TCP ACK (hereinafter referred to as TCP ACK), i.e. RTT is too long, the continuity of data transmitting by the transmitting side will be affected, thereby the rate will be affected. Especially in an asymmetric network, such as ADSL and mobile communication network, a congestion usually occurs due to the accumulation of a large amount of data caused by a narrow bandwidth in the direction of the narrow bandwidth, which results in that the TCP ACK cannot be timely transmitted back to the transmitting side, and the transmission rate will be reduced because of a congestion mechanism activated by the transmitting side, so that the data transmission efficiency will be significantly reduced.

As to the problem on how to improve the data transmission performance of the TCP/IP at a user side in the asymmetric network, the existing strategies mainly include:

Strategy 1: adjusting TCP window sizes of the transmitting and receiving sides, increasing the initial transmission window size of the transmitting side, limiting the rate of the transmitting side, adjusting the size of maximum data transmission unit, activating the path Maximum Transmission Unit (MTU) detection mechanism at the transmitting side, activating the direct congestion mechanism, and activating the timestamp mechanism, and etc. This strategy is a corresponding adjustment for the parameters and mechanisms of the existing TCP/IP and improves the data transmission performance of TCP/IP to some extent, but the strategy has some significant limitations: Firstly, the parameter adjustment often adopts different combinations of parameters for different application scenarios to achieve a certain effect, while cannot achieve a once-and-for-all unified effect; Secondly, in the actual Internet, the respective service node hosts are uncontrollable, thus it is difficult to modify the TCP/IP parameters.

Strategy 2: in the bi-directional data transmission, two transmission queues with different priorities are established: the queue with high priority buffers the TCP ACKs, while the queue with low priority buffers non-TCP ACKs data. The data of the TCP ACK queue with high priority is transmitted first. This policy can reduce the round-trip time delay of data transmission, and ensure the efficiency of data transmission in the case of bi-directional data transmission. However, there are also some limitations: Firstly, if the data transmission is only a one-way transmission, only the TCP ACK data packets are transmitted to the transmitting side by the receiving side, i.e. only the TCP ACK queue will buffer the data, thus the case of firstly transmitting the data of the queue with high priority does not exist, so that the roundtrip time delay of the data transmission of the transmitting side can not be improved and the data transmission efficiency can neither be improved; Secondly, if the data transmission is the bidirectional transmission, and the data of the TCP ACK queue is firstly transmitted in a certain direction, the data transmission of the non-TCP ACK queue will be affected to some extent because the bandwidth in this direction is fixed, thus affecting the efficiency of data transmission in this direction.

SUMMARY OF THE INVENTION

An embodiment of the present invention provides a method and apparatus for data transmission to solve the problem of the inefficiency of data transmission in prior art.

An embodiment of the present invention provides a method for data transmission comprising: establishing a First In First Out (FIFO) buffer for TCP/IP data packets, and receiving and buffering the TCP/IP data packets to be transmitted, wherein the TCP/IP data packets include TCP payload data packets and TCP ACKs; adjusting a queue of the buffered TCP/IP data packets in accordance with header information of the TCP/IP data packets; and transmitting sequentially the buffered TCP/IP data packets in the adjusted queue.

Preferably, the adjusting a queue of the buffered TCP/IP data packets in accordance with the header information of the TCP/IP data packets includes: when there are two TCP ACKs having same source and destination IP addresses, same TCP source port number and same destination port number, but different acknowledgement numbers in the buffer, retaining one of the two TCP ACKs that is most recently received and deleting the other TCP ACK.

Preferably, the one of the two TCP ACKs that is most recently received is inserted into a position of the most anterior TCP ACK among the deleted TCP ACKs.

Preferably, the adjusting a queue of the buffered TCP/IP data packets further includes: when there are two TCP ACKs having same source and destination IP addresses, same TCP source port number, same destination port number, and same acknowledgement number in the buffer, inserting the posterior TCP ACK into an adjacent position of the anterior TCP ACK.

Preferably, when there is a TCP payload data packet in the buffered queue, all TCP ACKs are inserted into a position anterior to the TCP payload data packet.

An embodiment of the present invention provides an apparatus for data transmission comprising: a data storage unit, being configured to buffer TCP/IP data packets being transmitted by FIFO, and receive and buffer the TCP/IP data packets to be transmitted, wherein the TCP/IP data packets include TCP payload data packets and TCP acknowledgement information TCP ACKs; a data packet information collecting unit, being configured to collect header information of the TCP/IP data packets in a queue of the buffered TCP/IP data packets, and provide the header information to a data packet queue adjusting unit; and the data packet queue adjusting unit, being configured to adjust the queue of the buffered TCP/IP data packets in the data storage unit in accordance with the header information collected by the data packet information collecting unit.

Preferably, the data packet header information collecting unit includes a TCP ACK collecting module, an IP address collecting module, a port number collecting module and an acknowledgement number collecting module; the TCP ACK collecting module being configured to determine whether the buffered TCP/IP data packet is a TCP ACK, and notify the IP address collecting module if the buffered TCP/IP data packet is determined to be the TCP ACK; the IP address collecting module, being configured to determine whether an IP source address and an IP destination address of the TCP ACK being most recently notified and an IP source address and an IP destination address of the TCP ACK being previously notified are same, and when both the IP source addresses and the IP destination addresses of these two TCP ACKs are determined to be same, notify the port number collecting module; the port number collecting module, being configured to determine whether the port numbers of these two TCP ACKs are same upon receiving the notification from the IP address collecting module, and when the TCP source ports and destination ports of these two TCP ACKs are same, notify the acknowledgement number collecting module; the acknowledgement number collecting module, being configured to receive the notification from the port number collecting module, and notify the comparison result of the acknowledgement numbers of these two TCP ACKs to the data packet queue adjusting unit; the data packet queue adjusting unit, being configured to delete the previously notified TCP ACK and notify the IP address collecting module when the comparison result indicates that the acknowledgement numbers are different.

Preferably, the data packet queue adjusting unit is further configured to insert the most recently notified TCP ACK into an adjacent position of the previously notified TCP ACK when the comparison result indicates that the acknowledgement numbers are same.

Preferably, the data packet queue adjusting unit is further configured to insert the most recently notified TCP ACK into the deletion position of the previously notified TCP ACK(s) after the previously notified ACP ACK(s) is deleted.

Preferably, the TCP ACK collecting module is further configured to notify the data packet queue adjusting unit when it is determined that there is a TCP payload in the buffered data; the data packet queue adjusting unit places the TCP payload posterior to all TCP ACKs.

Preferably, said apparatus for data transmission is located in an element or a mobile terminal at a data transmitting side.

According to the embodiments of the present invention, the IP data packets of TCP ACKs transmitted by the receiving side are processed, so that the amount of the TCP ACK responses is significantly reduced and the IP data packets for TCP ACKs are transmitted with priority, thereby the round-trip time delay for data transmitting can be reduced, the unnecessary data retransmission can be avoided, thus the data transmission efficiency can be improved.

DETAILED DESCRIPTION OF THE PREFERRED EMBODIMENTS

In the following, the present invention will be further described in details in conjunction with the accompanying drawings.

Figure 1:
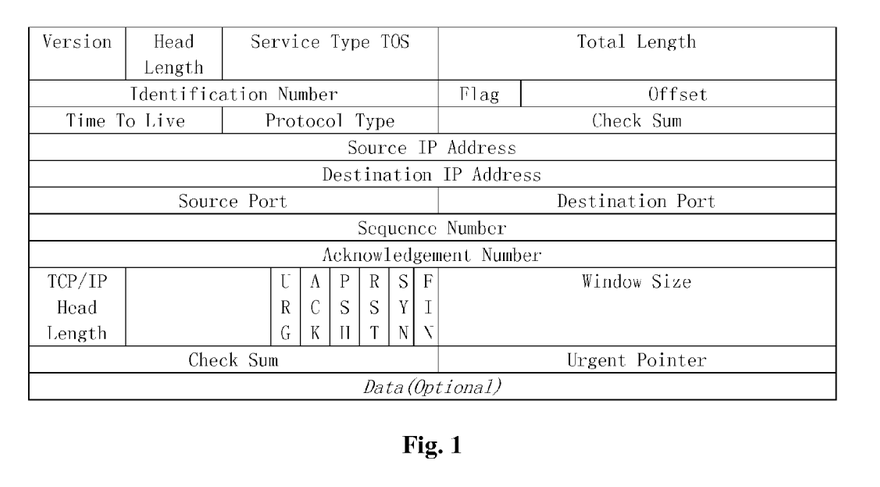
FIG. 1 is a schematic diagram illustrating a TCP/IP data packet header structure according to Ipv4.

Firstly, the regulations of the TCP/IP protocol for ensuring the packets correctly arriving at the destination side will be introduced: for a same connection, i.e. the connection wherein the IP source address and the destination address are same, a source side continually transmits data to a destination side while the destination side receives the data transmitted by the source side, both of them adopt TCP/IP data packet header sequence numbers and acknowledgement numbers to represent that the data bytes included in relevant data packets have been received. When the destination side receives the correct data from the source side, it transmits the IP data packets with an acknowledgement information TCP ACK (hereinafter, referred to as TCP ACK) to the source side. The TCP/IP data packet header structure as specified in IPV4 is shown in FIG. 1, which includes the IP source address and destination address, source port and destination port addresses, sequence number, acknowledgement number, or the payload data contained in the payload (if any), etc.

For example, it is assumed that host A transmits 10-byte session data to host B, where the TCP/IP header transmitted by host A includes the source side address 1028, the destination side address 23, the sequence number 1, the acknowledgement number 1, as well as the subsequent 10-byte data. It is assumed that host B would successfully receive such session data, does not transmit the payload data to the source side, and transmits the TCP ACK to host A. Here, the addresses of the source side and destination side are just opposite to those of the transmitting host A, specifically the source address 23, the destination address 1028; the sequence number is 1, representing that the data byte transmitted to the opposite side, i.e. the source side is 0; the acknowledgement number is 11, indicating the next byte expected to be received by host B. Upon receiving the TCP ACK from host B, host A knows that host B has received all bytes prior to the acknowledgement number, that is, 10 bytes prior to number 11, therefore continues to transmit data packets to host B, the sequence number of the TCP header is 11 at this point, indicating the number of bytes that has been transmitted to and received by the opposite side is 10 in this session. So if host B can still receive the segmented data correctly, the TCP ACK header sequence number returned by host B is 1, and the acknowledgement number is 21.

Figure 2:
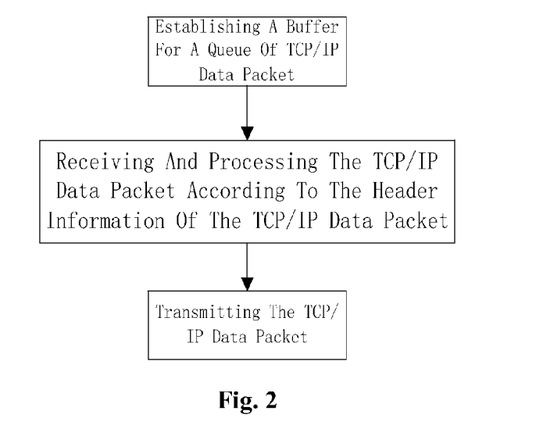
FIG. 2 is a schematic diagram illustrating a method embodiment of the present invention.

As shown in FIG. 2, a TCP/IP packet queue buffer is established in accordance with this embodiment, which is used for buffering the TCP ACK, and the TCP/IP data packets with the payload (i.e., IP data packets of TCP valid data), and the default order of the data packets is FIFO. Having set a capacity for the buffer, the TCP payload and TCP ACK enter the buffer during the receiving, and the TCP/IP data packet queue may be processed accordingly based on the information such as the source address, the destination address, and the acknowledge number contained in the TCP ACK, and transmitted to the opposite side upon the capacity reaching a preset value.

The buffered data packets may be processed in accordance with the following schemes:

1. When a TCP ACK is most recently received, if there is another TCP ACK in the buffered queue that has same IP address, port number and TCP ACK acknowledge number as the received TCP ACK, the recently received TCP ACK may be inserted into an adjacent position of the anterior TCP ACK with same acknowledgement number, for example, immediately thereafter, while these two TCP ACKs can be labeled as duplicated at the same time.

Because the TCP ACK(s) can be immediately generated when the receiving side receives an out-of-order message segment in accordance with TCP/IP protocol. Thus if the source side receives an out-of-order segment, it will immediately generate a TCP ACK. If the source side receives three duplicated TCP ACKs sent back by the receiving side, which indicates that the message segment transmitted by the source side is very likely to have been lost, and thus the retransmission is required, so that the second and third duplicated TCP ACKs may be found and forwardly inserted as soon as possible so as to accelerate the data retransmission at the source side.

2. When a TCP ACK is most recently received, if there is another TCP ACK labeled as "duplicated" in the buffered queue which has same IP address and port number but different acknowledgement number compared with the received TCP ACK, all the TCP ACKs labeled as "duplicated" previously received (of course, the address and port number are same) may be deleted, and the most recently received TCP ACK with different acknowledgement number may be placed at the end of the queue.

If the source and destination addresses and port numbers are same, but the acknowledgement numbers are different, it indicates that the number of correctly received bytes has been updated, for example, if the acknowledgement number of the preceding TCP ACK is 21 and the acknowledgement number of this TCP ACK is 31, it indicates that the first 30 bytes have been correctly received. If there are two or more TCP ACK messages labeled as "duplicated" as described in case 1 in the front section of the queue while both the acknowledgement numbers thereof are 21, it could have caused the generation of information "there are losses in the first 20 bytes of data, requesting the opposite side for retransmission". However, in accordance with this embodiment, now it can eliminate the possibility of the losses of the first 20 bytes of data and delete these duplicated TCP ACKs. And more preferably, a new TCP ACK can be inserted into the most anterior position of the deleted TCP ACKs, and more data packets from the opposite side can be more quickly acknowledged to the opposite side.

3. When a TCP ACK is most recently received, if there is another TCP ACK in the buffered queue which has same IP address and port number but different acknowledgement number compared with the received TCP ACK while there is no TCP ACK(s) label as "duplicated", all the TCP ACKs which have same IP address and port number but different acknowledgement numbers previously received may be deleted, and the most recently received TCP ACK is inserted into the most anterior position of the deleted TCP ACK(s).

Similar as in case 2, for example, if the acknowledgement number of the preceding TCP ACK is 21 and the acknowledgement number of this TCP ACK is 31, it indicates that the first 30 bytes have been correctly received, i.e. the TCP ACK message indicating that the first 20 bytes have been correctly received can be deleted, which may reduce the link load. A new TCP ACK may be inserted into the deleted position of the TCP ACK, thus more data packets can be more quickly acknowledged to the source side.

Figure 3:
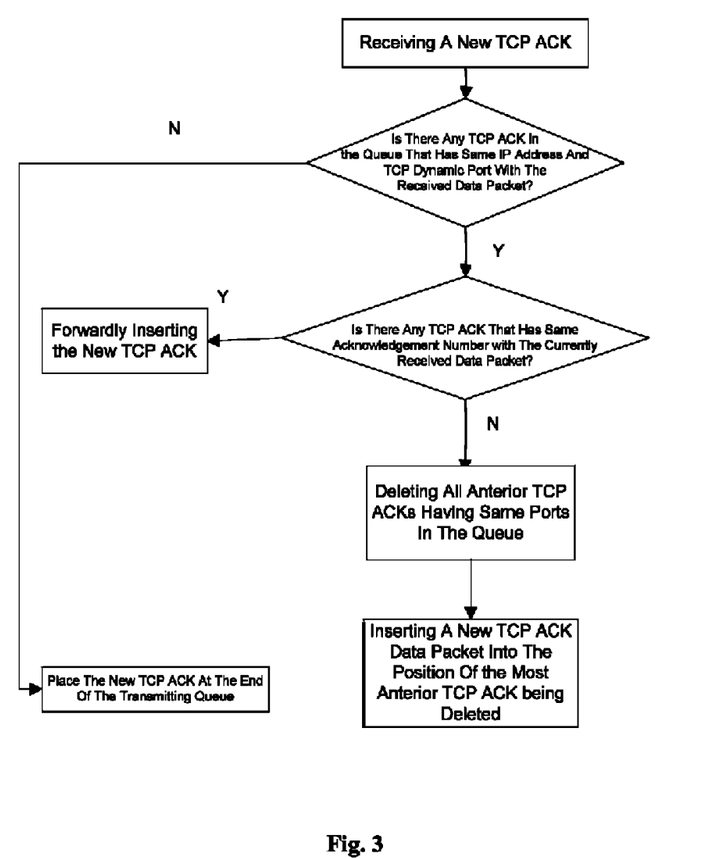
FIG. 3 is a flowchart illustrating the method embodiment of the present invention.

A specific embodiment provided by the present invention is as shown in FIG. 3, when receiving a new TCP ACK, it determines whether there is a TCP ACK having same IP address and TCP/IP dynamic port as the most recently received TCP ACK in the buffered queue, to determine whether it is the data transmission for same service between same source side and destination side.

If the ports and addresses are different, the new TCP ACK is placed into the buffered queue. If the ports and addresses are same, it determines whether there is a TCP ACK having same acknowledgement number with the most recently received TCP ACK in the buffered queue.

If it is affirmative, the current most recently received TCP ACK is forwardly inserted into the adjacent position of the previous one TCP ACK with same acknowledgement number, thus if there are three duplicated TCP ACKs with the same acknowledgement number that indicating that the related data is required to be retransmitted, the transmitting side will receive this message and retransmit it as soon as possible. Meanwhile, both the current most recently received TCP ACK and the previous one TCP ACK with the same acknowledgement number may be labeled as "duplicated".

If the result of the determination indicates that there is no TCP ACK having same acknowledgement number as the most recently received TCP ACK, all TCP ACKs having same port and address as the most recently received TCP ACK anterior thereto may be deleted. More preferably, the most recently received TCP ACK may be inserted into the most anterior position of the deleted TCP ACK(s), such that the response information for the correctly received data can be transmitted to the source side as soon as possible.

In deleting all the TCP ACKs having same port and address with the most recently received TCP ACK anterior thereto as described above, it may contain TCP ACK(s) labeled as "duplicated", the message that would have been generated as "message is lost, please retransmitting it" will not be transmitted to the source side because of the update for the correctly received response TCP ACK, so that the unnecessary retransmission of the data can be eliminated. The deleted TCP ACK(s) may also include some TCP ACK(s) being not labeled as "duplicated", and these responses become unnecessary because of the inclusion of TCP ACKs with most recently received acknowledgement numbers. Therefore, the link load can be reduced by the deletion of these TCP ACK(s).

Figure 4:
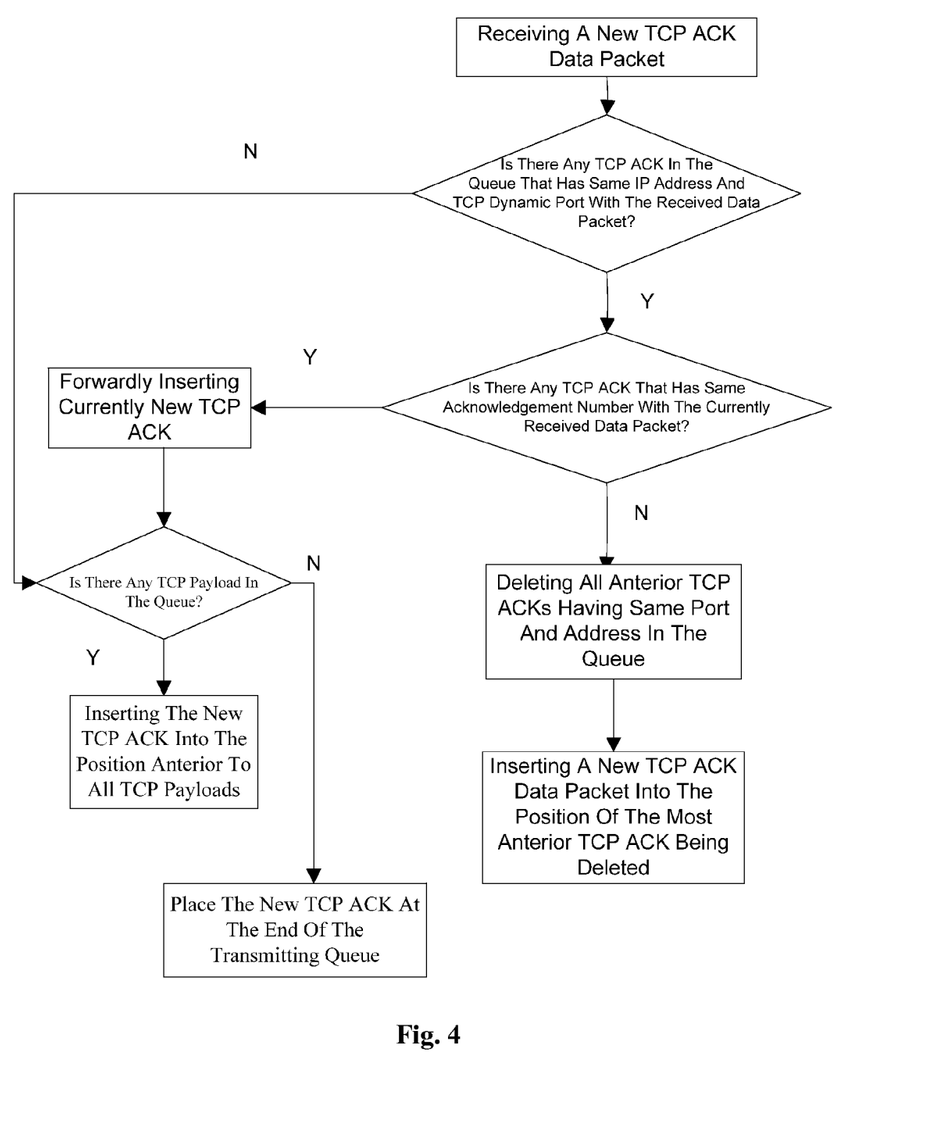
FIG. 4 is a flowchart illustrating another method embodiment of the present invention.

As illustrated in FIG. 4, another embodiment of the present invention provides a more preferred implementation.

The right half of FIG. 4 illustrates an embodiment that is same as the embodiment illustrated in FIG. 3, i.e. when a new TCP ACK is received and there is another TCP ACK in the buffered queue which has same port and address but different sequence number compared with the received TCP ACK, the process is almost same, and the difference is in that, in case there is no TCP ACK in the buffered TCP/IP data packet queue which has same TCP port and IP address as the newly received TCP ACK, or in case that there is another TCP ACK in the buffered TCP/IP data packet queue which has same TCP port and IP address as well as same acknowledgement number as the newly received TCP ACK, and the posteriorly received TCP ACK may be inserted into the adjacent position of the anterior TCP ACK, it determines whether there are TCP/IP data packets having payload in the buffered queue. If there are the TCP/IP data packets having payload, the received TCP ACK may be inserted anterior to all the TCP/IP data packets having payload, so that TCP ACKs may be given priority to be transmitted and the acknowledgement of the data transmitted by the source side can be accelerated, thus the efficiency of the data transmission by the source side can be improved.

In accordance with another implementation, it determines whether there is data having payload based on a header of the TCP data packet, and if there is such a data, all the TCP ACKs will be placed anterior to the payload of TCP, and the positions of the TCP ACKs in the queue are adjusted in accordance with the above mentioned determination method.

The above implementation is more effective to improve the transmission efficiency in the uplink and downlink asymmetrical network. In accordance with the embodiment illustrated in FIG. 3 and the above mentioned preferred implementation, an actual measurement is carried out in such Time Division-Synchronous Code Division Multiple Access (TD-SCDMA) as the uplink and downlink asymmetrical network, wherein the buffer is allocated only in a terminal at one side, and the measurement results are compared in Table 1 as follows:

TABLE 1

| Transmission mode | Uplink Bandwidth (Downlink Bandwidth is 1.5M HSDPA) | Normal Transmission | | The Present Invention | |
|---|---|---|---|---|---|
| | | Uplink Rate | Downlink Rate | Uplink Rate | Downlink Rate |
| Uplink and Downlink Parallel Transmission | 16 kbps | 13.9 kbps | 5.8 kbps | 21.5 kbps | 584.9 kbps |
| | 32 kbps | 30.7 kbps | 60.8 kbps | 0.05 Mbps | 1.17 Mbps |
| | 64 kbps | 62.6 kbps | 72.5 kbps | 0.08 Mbps | 1.48 Mbps |
| | 128 kbps | 126.6 kbps | 63.8 kbps | 0.14 Mbps | 1.48 Mbps |

As shown in Table 1, the uplink rate and the downlink rate (especially the downlink rate) increase as much as 20 to 100 times. It should be noted that the uplink rate in accordance with the present invention is higher than the uplink bandwidth of the network, for example, in case that the uplink bandwidth is 128 Kbps, the uplink rate is 0.14 Mbps; and in case that the uplink bandwidth is 32 Kbps, the uplink rate is 0.05 Mbps. The reason lies in that the redundant TCP ACKs are deleted in the above implementation, while the data displayed on the monitor computer is actually the raw data generated by the receiving side before the deletion.

The apparatus for implementing the above transmission method in accordance with the present invention may be provided within a mobile terminal, at a network side, or at an element located in a network during the data transmission. More preferably, the apparatus for implementing the above transmission method in accordance with the present invention may be provided in a core network server or a mobile terminal at a data transmitting side, or at an element located near the transmitting side.

Figure 5:
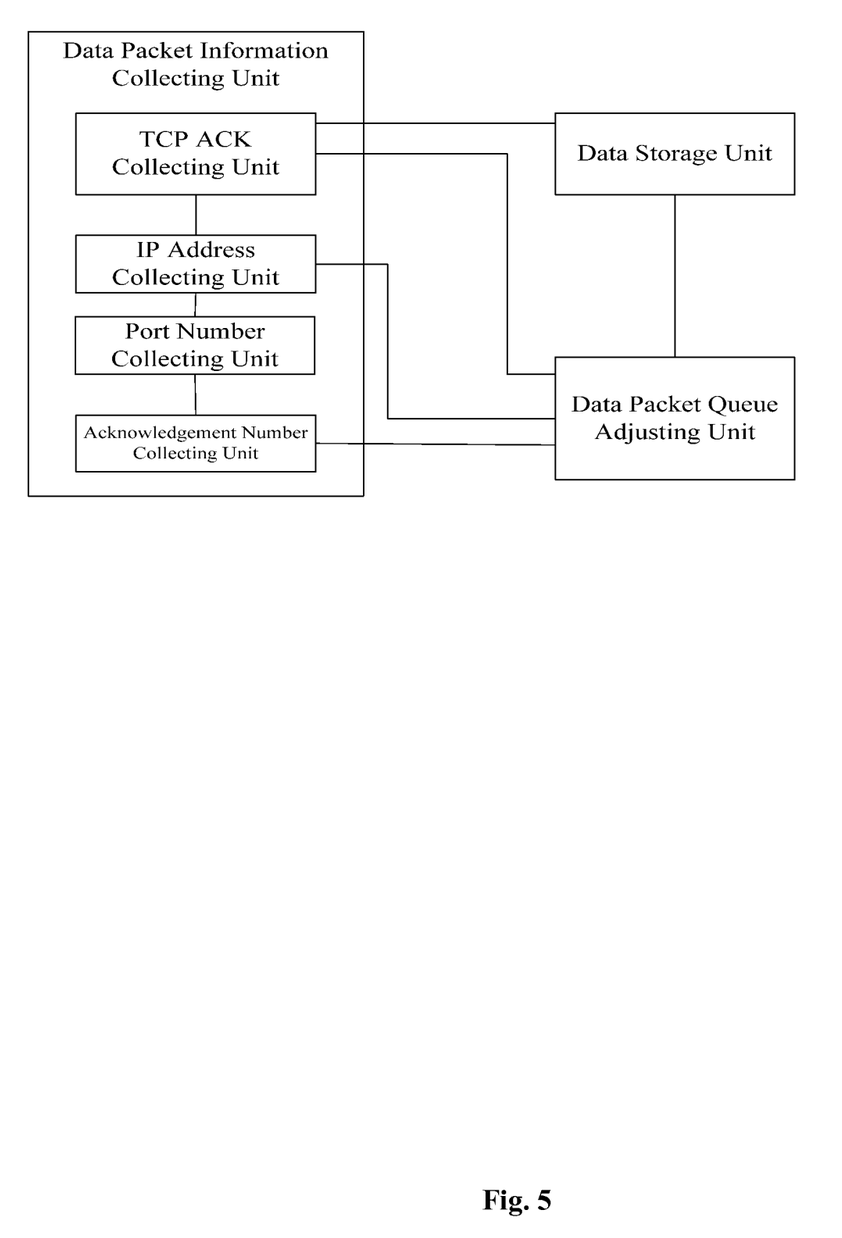
FIG. 5 is a structure diagram illustrating an apparatus embodiment of the present application.

As illustrated in FIG. 5, an apparatus for data transmission in accordance with a preferred embodiment of the present invention comprises:

a data storage unit, being configured to buffer TCP/IP data packets being transmitted;

a data packet information collecting unit, being configured to collect header information of the buffered data packets, and provide the header information to a data packet queue adjusting unit; and the data packet queue adjusting unit, being configured to adjust the queue of the data packets in the data storage unit in accordance with the header information collected by the data packet information collecting unit.

Wherein, the data packet header information collecting unit includes: a TCP ACK collecting module being configured to determine whether the buffered data packet is a TCP ACK, and notify an IP address collecting module, if the buffered data packet is determined to be the TCP ACK;

an IP address collecting module, being configured to determine whether the source addresses and destination addresses of the TCP ACKs being notified are same, and when both the source addresses and the destination addresses of two TCP ACKs are determined to be same, notify a port number collecting module;

the TCP port number collecting module, being configured to receive the notification from the IP address collecting module and determine whether the port numbers of the two TCP ACKs are same, and when the source ports and destination ports of these two TCP ACKs are determined to be same, notify an acknowledgement number collecting module;

the acknowledgement number collecting module, being configured to receive the notification from the port number collecting module, and notify the comparison result of the acknowledgement numbers of these two TCP ACKs to a data packet queue adjusting unit;

the data packet queue adjusting unit, being configured to delete the anterior TCP ACK, insert the posterior TCP ACK into the deletion position, and notify the IP address collecting module to continue determining, when the comparison result indicates that the acknowledgement numbers are different; and insert the posterior TCP ACK into an adjacent position of the anterior TCP ACK when the comparison result indicates that the acknowledgement numbers are same, so that the TCP ACK information indicating "data is correctly received" can be transmitted to the data source side as early as possible, the unnecessary data retransmission can be avoided, and the link load can also be reduced.

When the TCP ACK collecting module determines that there is TCP/IP payload data in addition to the TCP ACKs in the buffered data, it notifies the data packet queue adjusting unit; the data packet queue adjusting unit places the TCP/IP payload data posterior to all the TCP ACKs, so that the TCP ACKs can be transmitted with priority, and the acknowledgement of the data transmitted by the source side can be accelerated, thereby the data transmission rate at the source side can be improved.

Under the teaching of the above implementations and embodiments, those skilled in the art may clearly understand that the present invention may be implemented by software and necessary general hardware platform, and also can be implemented by hardware, although in most cases the former is more preferred. Based on the above understanding, the technical solution of the present invention substantially or the portions that contributes to the prior art can be embodied in software product, and such software product is stored in a storing medium, including some instructions for facilitating a terminal device to carry out methods according to the embodiments of the present invention.

The above description is only preferred embodiments of the present invention, it should be noted that many changes and modifications can be made without departing from the principle of the present invention for those skilled in the art, and these changes and modifications also fall into the protection scope of the present invention.

What is claimed is:

1. A method for data transmission, comprising:
   establishing a First In First Out, FIFO, buffer for Transmission Control Protocol/Internet Protocol, TCP/IP, data packets to be transmitted, receiving and buffering the TCP/IP data packets in the buffer, wherein the TCP/IP data packets include TCP payload data packets and TCP acknowledgement information, TCP ACK;
   adjusting a queue of the buffered TCP/IP data packets in accordance with header information of the TCP/IP data packets; and
   transmitting sequentially the buffered TCP/IP data packets in the adjusted queue,
   wherein the adjusting of the queue of the buffered TCP/IP data packets in accordance with the header information of the TCP/IP data packets includes
   when at least two buffered TCP ACKs have same source and destination IP addresses, a same TCP source port number and a same destination port number, but different acknowledgement numbers, retaining one of the at least two buffered TCP ACKs that is most recently received and deleting other of the at least two buffered TCP ACKs,
   wherein the retaining of the one of the at least two buffered TCP ACKs that is most recently received includes inserting the one of the two buffered TCP ACKs in a position of most anterior TCP ACK among the deleted other of the at least two buffered TCP ACKs, and
   wherein the deleted other of the at least two buffered TCP ACKs was previously labeled as duplicated prior to the adjusting of the queue.

2. The method for data transmission according to claim 1, wherein the adjusting of the queue of the buffered TCP/IP data packets in accordance with the header information of the TCP/IP data packets further comprises:
   when other at least two buffered TCP ACKs have other same source and destination IP addresses, another same TCP source port number, another same destination port number, and another same acknowledgement number, inserting one of the other at least two buffered TCP ACKs that is most recently received into an adjacent position of an anterior TCP ACK that has the other same source and destination IP addresses, the other same TCP source port number, the other same destination port number, and the other same acknowledgement number.

3. The method for data transmission according to claim 1, further comprising: when there is a TCP payload data packet in the queue of the buffered TCP/IP data packets, inserting all buffered TCP ACKs into a position anterior to the TCP payload data packet.

4. A method for data transmission, comprising:
   establishing a First In First Out, FIFO, buffer for Transmission Control Protocol/Internet Protocol, TCP/IP, data packets to be transmitted, receiving and buffering the TCP/IP data packets in the buffer, wherein the TCP/IP data packets include TCP payload data packets and TCP acknowledgement information, TCP ACK;
   adjusting a queue of the buffered TCP/IP data packets in accordance with header information of the TCP/IP data packets; and
   transmitting sequentially the buffered TCP/IP data packets in the adjusted queue,
   wherein the adjusting of the queue of the buffered TCP/IP data packets in accordance with header information of the TCP/IP data packets comprises:
   when at least two buffered TCP ACKs have same source and destination IP addresses, a same TCP source port number, a same destination port number, and a same acknowledgement number, inserting one of the two buffered TCP ACKs that is most recently received into an adjacent position of an anterior buffered TCP ACK that has the same source and destination IP addresses, the same TCP source port number, the same destination port number, and the same acknowledgement number, maintaining the anterior buffered TCP ACK in a position adjacent to the most recently received TCP ACKs, and labeling the at least two buffered TCP ACKs as duplicated.

5. The method for data transmission according to claim 4, further comprising: when there is a TCP payload data packet in the queue of the buffered TCP/IP data packets, inserting all TCP ACKs into a position anterior to the TCP payload data packet.

6. A method for data transmission, comprising:
   receiving, in a First In First Out, FIFO, buffer queue, Transmission Control Protocol/Internet Protocol, TCP/IP, data packets, wherein the TCP/IP data packets include TCP payload data packets and TCP acknowledgement information, TCP ACK;
   determining that a received TCP ACK has a same source and destination IP addresses, a same TCP source port number and a same destination port number as at east one queued TCP ACK;
   determining whether the received TCP ACK has a same acknowledgement number as the at least one queued TCP ACK,
   wherein when the received TCP ACK has a same source and destination IP addresses, a same TCP source port number, a same destination port number, and a same acknowledgement number as the at least one queued TCP ACK the received TCP ACK is inserted into the queue adjacent to the at least one queued TCP ACK, the at least one queued TCP ACK is maintained at its position in the queue, and the received TCP ACK and the at least one queued TCP ACK are labeled as duplicated.

7. The method of claim 6, wherein the queue includes a third TCP ACK having the same source and destination IP addresses, the same TCP source port number and the same destination port number, and the same acknowledgement number, wherein the third TCP ACK is adjacent to one of the received TCP ACK and the at least one queued TCP ACK.

8. The method of claim 6, further comprising:
   determining that another received TCP ACK has the same source and destination IP addresses, the same TCP source port number and the same destination port number, but a different acknowledgement number from the received TCP ACK and the at least one queued TCP ACK, which are labeled as duplicated, and then deleting the received TCP ACK and the at least one queued TCP ACK from the queue and inserting the another received TCP ACK at an end of the queue.

9. The method of claim 6, further comprising:

determining that another received TCP ACK has a same source and destination IP addresses, a same TCP source port number and a same destination port number, but a different acknowledgement number from at least one other queued TCP ACK, wherein when the another queued TCP ACK is not labeled as duplicated, all queued TCP ACKs having the same source and destination IP addresses, the same TCP source port number and the same destination port number, but the different acknowledgement number from the another received TCP ACK are deleted from the queue and the another received TCP ACK is inserted into a most anterior position in the queue of the deleted TCP ACKs.

* * * * *